United States Patent [19]

Culver et al.

[11] 4,200,985
[45] May 6, 1980

[54] VISUAL INDICATOR FOR ALTERNATE UNITS OF MEASURE

[75] Inventors: Irven H. Culver, Playa del Rey; Oleg Szymber, Palos Verdes, both of Calif.

[73] Assignee: Primus Mfg., Inc., San Lorenzo, P.R.

[21] Appl. No.: 870,466

[22] Filed: Jan. 18, 1978

[51] Int. Cl.$^2$ ............................................... G01B 3/12
[52] U.S. Cl. ............................... 33/141 R; 33/125 M
[58] Field of Search ............ 33/141 R, 125 M, 147 R, 33/166, 172 R; 116/129 E, DIG. 47

[56] References Cited

U.S. PATENT DOCUMENTS

| | | | |
|---|---|---|---|
| 3,378,929 | 4/1968 | Deardorff et al. | 33/141 R |
| 3,802,082 | 4/1974 | Gornowitz | 33/141 R |
| 3,936,943 | 2/1976 | Bullard | 33/125 M |

Primary Examiner—Steven L. Stephan
Attorney, Agent, or Firm—Christie, Parker & Hale

[57] ABSTRACT

A mechanical device alternately visually displays measurements, such as measurements of distance, in either one of two different units of measure. The apparatus comprises a dimensionless rotary indicator means carried by a frame to be visually observable by a user. The indicator means has rotatable input means and is calibrated in units and selected fractions thereof. Motion amplifying gear means are carried by the frame and are continuously coupled to the indicator means. The gear means operate the indicator input means faithfully in response to rotation of a rotary input shaft to the apparatus. The gear means include alternate input gears which are alternately engageable in a more directly driven relation with the input shaft than the other. The apparatus also includes selectively operable mode selector means, operable for engaging one or the other of the alternate input gears in said more directly driven relation. The gear ratios between the input gears and the indicator input means are different by an amount corresponding to the conversion factor between the two different units of measure which preferably are inches and centimeters.

21 Claims, 12 Drawing Figures

U.S. Patent  May 6, 1980  Sheet 1 of 6  4,200,985
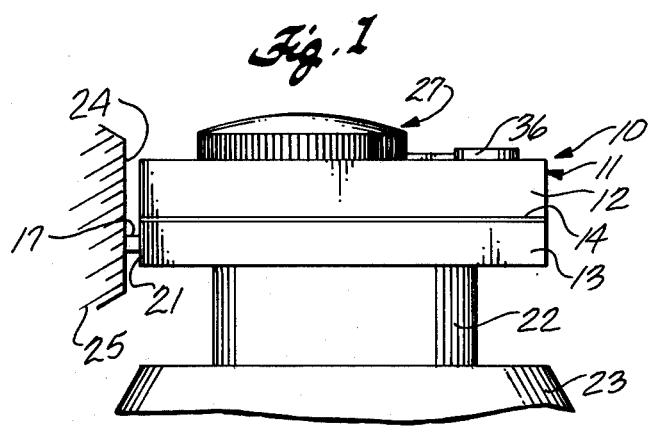
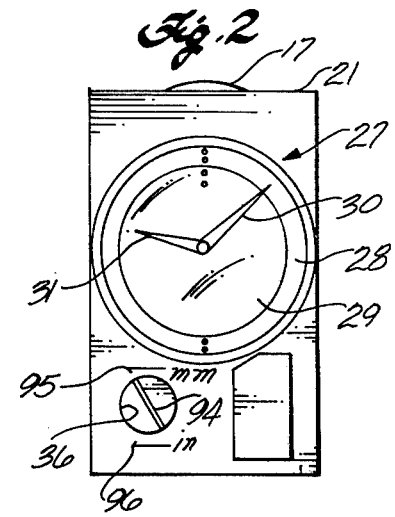
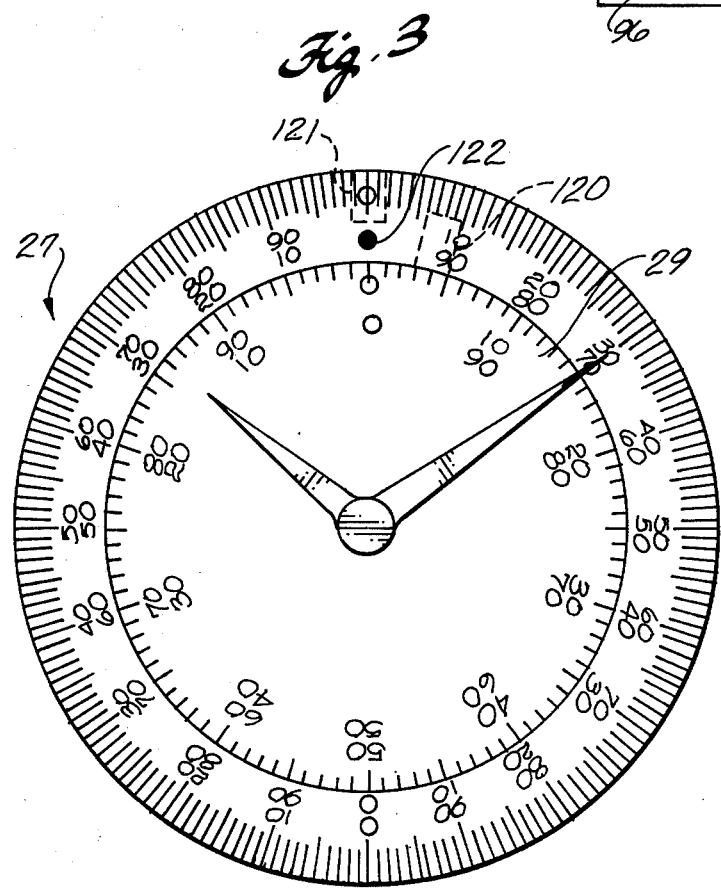

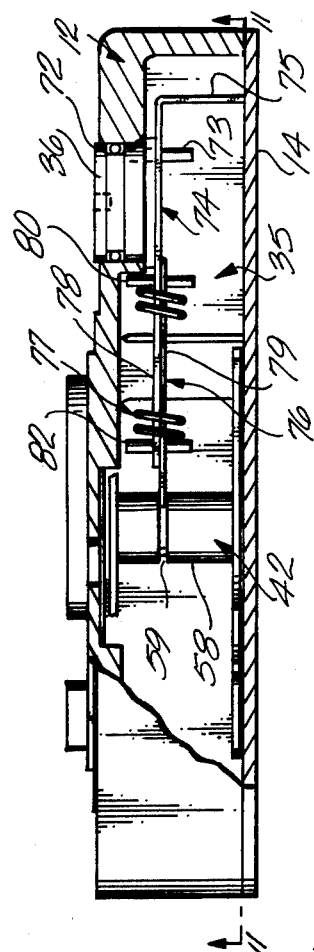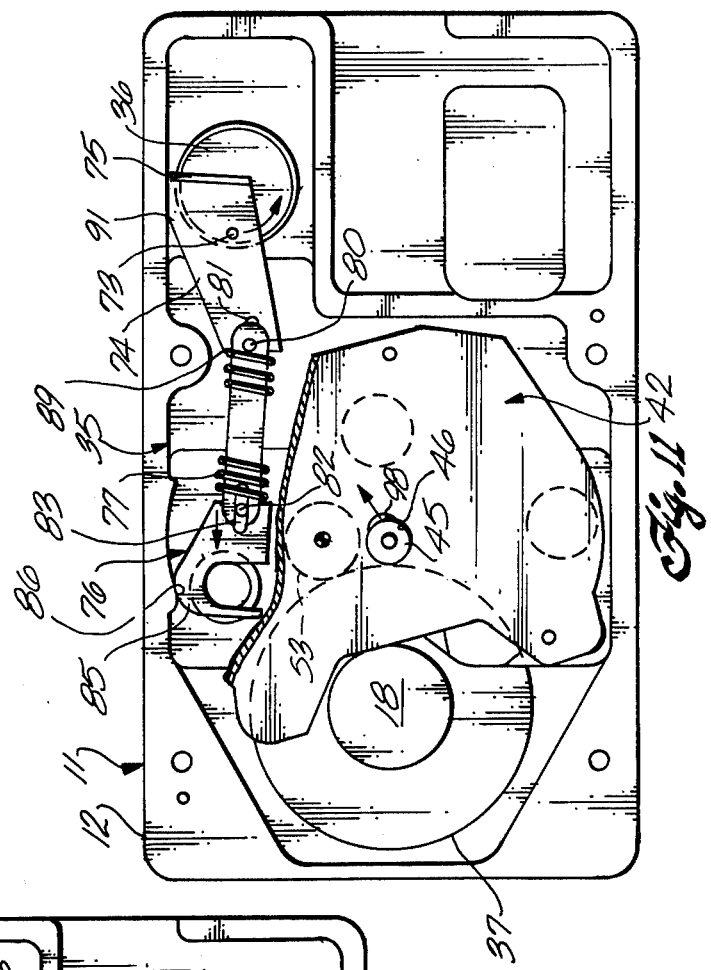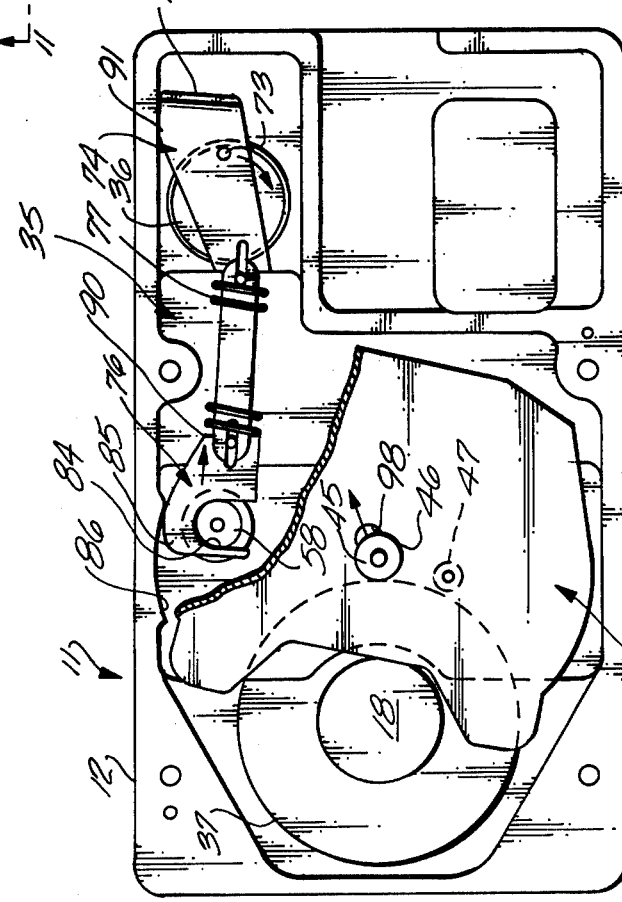

VISUAL INDICATOR FOR ALTERNATE UNITS OF MEASURE

BACKGROUND OF THE INVENTION

1. Field of the Invention

This invention pertains to friction wheel distance measuring devices and instruments. More specifically, it pertains to such devices which are essentially mechanical and which include an internal mechanism, coupled between the friction wheel and a visual measurement readant, which is switchable to cause the readout to represent measurements in either the English measurement system or the metric measurement system.

2. Review of the Prior Art

Friction wheel distance measuring devices are well known and have gained wide use as accessories for machine tools and the like. The precision, accuracy, reliability and effectiveness of such devices are so great and so well recognized that such devices have themselves then adopted as principal components of precision testing and measuring machines, such as height gages and machine tool control systems. The most widely known friction wheel measuring device is marketed worldwide under the trademark "TRAV-A-DIAL", and is a principal component of measuring systems sold under the trademarks "TEDD" and "TRAK" and of machine tool control systems sold under the trademark "TEDD Command".

(Strictly speaking, products currently manufactured under the trademarks mentioned above do not rely upon friction between the wheels thereof and the surfaces along which the wheels roll in use. Current products bearing or sold under these marks incorporate the improvement described in U.S. Pat. No. 3,771,228, and thus rely on a self-generated microscopic rack and pinion effect in the interface between the wheel and the surface along which it rolls in use. Products of this type have come to be known, however, as "friction wheel measuring devices", and it is in this art-recognized sense that this term is used in the present document.)

TRAV-A-DIAL measuring devices are manufactured by the assignee of the present invention; such devices, and also the measuring and machine tool control systems of which such devices of their principal mechanisms are components, are sold in the United States and elsewhere by Southwestern Industries, Inc., Los Angeles, California.

U.S. Pat. Nos. 3,307,265, 3,311,985, 3,561,121, and 3,771,228, for example, all owned by the assignee of this invention, pertain to TRAV-A-DIAL measuring devices.

Friction wheel measuring devices in their purest form, and as first introduced, are entirely mechanical devices in which a hardened steel metering wheel of known circumference is coupled by a motion amplifying gear train to a visual readout mechanism. In use, the housing of the device, from which the rim of the metering wheel protrudes, is mounted to one of two relatively movable parts, such as a lathe carriage, for forceful rolling contact of the wheel rim with the other of the two movable parts, such as a lathe bed. As the lathe carriage is moved along the lathe bed, for example, the wheel rolls faithfully without slippage along the lathe bed. The amount of rotation of the wheel is thus directly related to the distance the carriage is moved along the lathe bed. Since the circumference of the wheel is known, the indication of wheel rotation presented by the readout mechanism is an accurate measurement of the distance movement of the lathe carriage along the lathe bed.

The first TRAV-A-DIAL measuring devices were structured to cause measurements made to be displayed in the English measurement system, i.e., in inches and in tenths, hundredths and thousandths of an inch. Later, a different arrangement of this device was produced which caused measurements made to be displayed in the metric measurement system, i.e., in millimeters and in tenths and hundredths thereof. These devices were entirely mechanical, and different devices were needed to obtain measurements in the different measurement systems. See U.S. Pat. Nos. 3,311,985 and 3,378,929.

Thereafter, an electronically operated remote readout mechanism was developed for use with TRAV-A-DIAL measuring devices. To enable the remote readout to be used, a signal generator was incorporated into the measuring device, the generator output signals being supplied to and operated on by the remote readout which displayed the measurement made by the wheel in the same units of measure as shown by the original readout mechansim which was retained in the measuring device itself; see British Pat. No. 1,189,323.

The advantages of the remote readout were, among others, that it could display measurements of distances greater than a single revolution of the metering wheel, and could be located in a place more easily seen by the user than the measuring device itself which, by necessity due to the nature of the machine tool, might have been mounted in an obscured location. Also, by appropriate manipulation in the remote readout of the signals supplied to it in response to operation of a mode selector later made a part of the remote readout, it was possible to cause the remote readout to display measurements of interest in units of either the English or the metric measurement systems. These remote readout measurement systems were and are substantially more expensive than the purely mechanical measuring devices, and were and are marketed under the trademark TEDD.

A variation of the TEDD distance measurement system is the TRAK measurement system in which the friction wheel, gear train and signal generator assembly, mounted to the machine tool, has no visual readout mechanism itself and functions as a displacement sensor and signal generator for a digitally displaying remote readout. TRAK measurement systems also display measurements of interest in either English or metric units of measure. These systems are also more costly than the purely mechanical TRAV-A-DIAL measuring devices.

For many years, industry has produced machined parts dimensioned in either English or metric units of measure. In Europe, products made for export to the United States or to England, for example, were made with parts dimensioned in English units of measure, whereas the same products intended for European or other sale incorporated parts dimensioned in metric units of measure. More recently, United States industry has increasingly produced parts dimensioned metrically; this has been done to make United States products more salable abroad. Also, it may have been done in anticipation of the conversion from English to metric measurement systems which is now well underway in England and is beginning in the United States. Today, it is common for United States designers of machined parts to dimension the parts either both in English and metric units, or only in metric units.

It has been determined that a need, and therefore also a market, exists for purely mechanical distance measuring devices which are of relatively low cost and which can display measurements of interest in either English or metric units of measure. Heretofore, as shown above, separate devices were required to provide English and metric units of measure, unless one was willing to use the more costly measuring systems having remote readout and display units.

This need is reflected by the availability of machine tool conversion dial assemblies which, when installed in a machine tool such as a lathe, enable measurements to be made in either English or metric units. One such conversion dial assembly is manufactured by Sipco Machine Co., Marion, Massachusetts, and has separate English and metric scales both of which are visible to the tool operator. Another conversion dial has a single scale which, by movement of datum lines, is readable either in English or metric units; this dial assembly is manufactured by Jergens Inc., Cleveland, Ohio; see U.S. Pat. No. 3,651,780. Both the Sipco and Jergens dials connect to the tool leadscrew and are susceptible to all errors in the leadscrew. Both use a planetary gear drive; in the Sipco dial both scales are driven, and in the Jergens dial the planetary is locked when the mechanism is in its "English" operating mode. Neither arrangement is sufficiently compact to enable use in a friction wheel measuring device. Also, these dial assemblies are themselves expensive. The need identified above still has not been fully satisfied by the prior art.

SUMMARY OF THE INVENTION

This invention provides a purely mechanical friction wheel distance measuring device which provides, at the device itself, a display of measurements of interest according to either English or metric units of measure at the selection of the user. The device is compact, rugged and reliable. Measurements are displayed on a visually readable, coaxially driven concentric pair of indicators, each of which includes a circular scale and a referencing element which preferably is a pointer. The indicators are dimensionless, and are interpreted by the user in terms of the units of measure of interest at the time as determined by the state of an English-metric mode selector operable by the user. One scale is graduated to indicate basic units of measure (inches or centimeters). The other scale functions to indicate decimal fractions of the basic units of measure. The indicators are always coupled to the friction wheel via gearing within the housing of the device; the mode selector has only two stable discrete operative states corresponding to English and metric measurement systems.

The gearing is characterized by the feature that a portion thereof is always coupled between the indicators and the frictionally driven metering wheel. Operation of the mode selector modifies the effective gear ratio between the metering wheel by an amount equal to the conversion factor between the basic units of measure in the two different measurement systems.

Generally speaking, this invention provides mechanical apparatus for alternately visually displaying measurements such as measurements of distance in either one of two different units of measure. The apparatus comprises dimensionless rotary indicator means carried by a frame to be visually observable by a user of the apparatus. The indicator means has rotatable input means and is calibrated in units and selected fractions thereof. Motion amplifying gear means are carried by the frame and are continuously coupled to the indicator means. The gear means operate the indicator input means faithfully in response to rotation of a rotary input shaft to the apparatus. The gear means include alternate input gears alternately engageable in a more directly driven relation with the input shaft than the other. Selectively operable mode selector means are operable for engaging one or the other of the alternate input gears in said more directly driven relation. The gear ratios between the input gears and the indicator input means are different by an amount which corresponds to the conversion factor between the two different units of measure.

DESCRIPTION OF THE DRAWINGS

The above-mentioned and other features of this invention are more fully set forth in the following detailed description of a presently preferred embodiment of the invention, which description is presented with reference to the accompanying drawings, wherein:

FIG. 1 is an elevation view of a friction wheel measuring device which provides the preferred environment and utility of the presently preferred mechanism according to this invention;

FIG. 2 is a top plan view of the measuring device shown in FIG. 1;

FIG. 3 is an enlarged view of the indicator of the measuring device shown in FIGS. 1 and 2;

FIG. 10 is an elevation view, partially in cross-section, of the measuring device showing the mode selector mechanism;

FIG. 11 is a bottom plan view of the mechanism shown in FIG. 10, illustrating the mode selector mechanism in one of its two operable states; and FIG. 12 is a view similar to that of FIG. 11 showing the mode selector mechanism in the other of its operable states.

DESCRIPTION OF THE ILLUSTRATED EMBODIMENT

Figure 4:
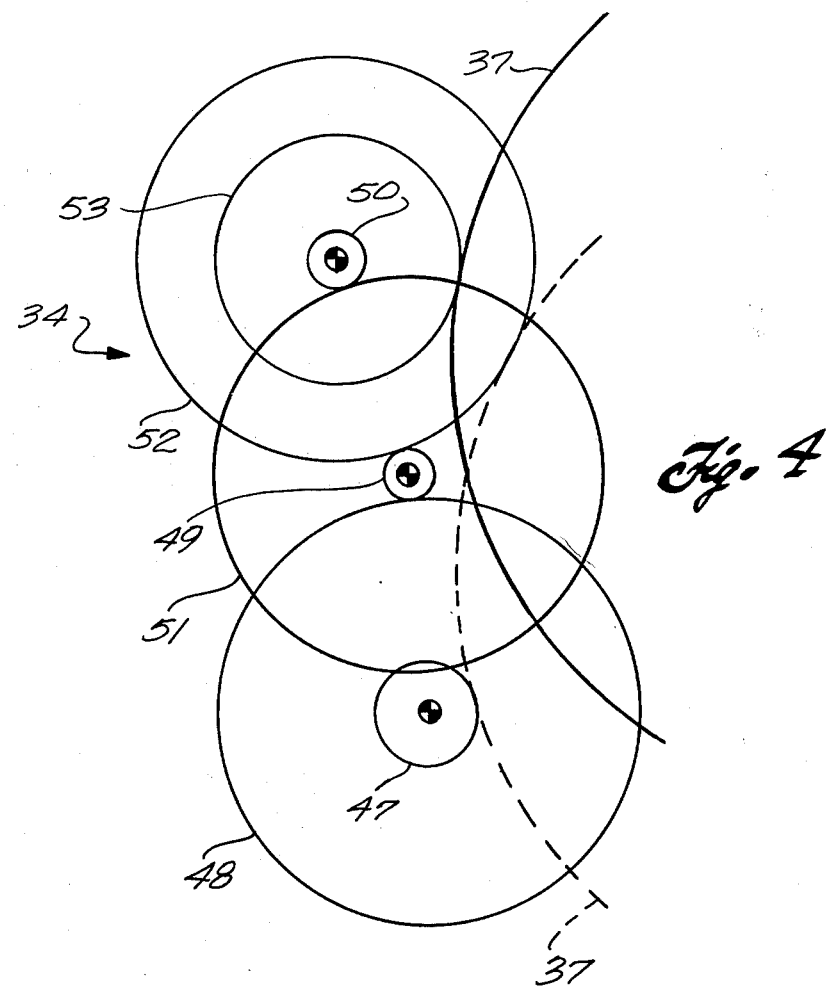
FIG. 4 is a simplified plan view of the gearing in the measuring device, and represents the gearing in its two alternate operative states.

The presently preferred application for and utility of this invention is in a friction wheel measuring device 10 as shown in FIG. 1. The measuring device preferably is of the type of which U.S. Pat. Nos. 3,311,985 and 3,378,929 are descriptive. The device includes a housing 11 composed of an upper part 12, a lower part 13, and an intermediate plate 14. The housing defines an upper chamber 15 and a lower chamber 16 on opposite sides of the intermediate plate 14. A metal metering wheel 17 of precisely predetermined circumferential extent is fixed upon a wheel shaft 18. The wheel shaft is rotatably supported in suitable thrust and journal bearings 19 and 20 (see FIG. 5 in which the bearings are illustrated in simplified form) within the housing upper and lower parts. The wheel shaft rotates about an axis fixed relative to the housing. The rim of the metering wheel projects through an opening in a front face 21 defined by the housing lower part.

Measuring device 10 has many uses in many different applications. A typical use of the measuring device is in the context of a machine tool where the device is relied upon to make accurate measurements of the distance which one part of a machine tool moves along a predetermined path relative to another part of the machine tool. For example, as shown in FIG. 1, measuring device 10 is connected by a mounting mechanism 22 to a lathe carriage 23, for example, so that the rim of metering wheel 17 engages and rolls along a machined surface 24 (a measurement surface) defined by the lathe bed 25, for example. Mounting mechanism 22 preferably is of the type of which U.S. Pat. No. 3,844,044 is descriptive; alternatively, the mounting mechanism may be defined in accord with the teachings of U.S. Pat. Nos. 3,740,856 or 3,724,082. In any event, the mounting mechanism 22 incorporates a resilient bias system which, in view of the cooperation between the mounting mechanism and device 10, is effective to forceably urge the rim of metering wheel 17 into contact with measurement surface 24. As a result, as lathe carriage 23 moves relatively along the lathe bed 24, the metering wheel rolls faithfully along the measurement surface, without slippage, to sense the actual distance of travel of the carriage along the lathe bed.

An indicator 27 is mounted to the upper portion of the measuring device to be visually observable by a user of the device. The indicator preferably includes dual concentric circular dials 28 and 29 each carrying a circular scale on its upper face adjacent its periphery. A pair of rotary pointers 30 and 31 cooperate with respective ones of the circular scales and are mounted upon respective ones of concentric drive shafts 32 and 33 (see FIG. 5, for example) which are driven by a molten amplifying gearing 34. The gearing is disposed within housing upper chamber 15 is and coupled between wheel shaft 18 and indicator shafts 32 and 33. Shafts 32 and 33 may be considered as either indicator input shafts or gearing output shafts.

As shown best in FIG. 3, the scales of dials 28 and 29 are themselves dimensionless. Dial 29 contains two scales having a common origin; the two scales are subdivided into 100 parts and proceed in opposite directions around the dial from the common origin. Outer dial 28 has its periphery divided into two hundred regularly spaced increments. The major indicia of dial 28 are associated with each tenth increment and are in two sequences, one proceeding clockwise of the dial and the other proceeding counterclockwise of the dial; in each sequence, the indicia are by tens from 0 to 90, two times, in series. The scale on the inner dial represents units and multiple units of measure, whereas the scale on the outer dial represents decimal fractions of a unit.

As will become apparent from the following detailed description, gearing 34 is arranged to define two different gear ratios between metering wheel 17 and the indicator input shafts, depending upon the state of a mode selector 35 (see FIGS. 10, 11 and 12) which has a manually operable actuator member 36 accessible on the upper surface of the measuring device as shown in FIG. 2. The difference between these gear ratios, as reflected at the indicator 27, corresponds to the conversion factor between two different units of measure in which the measuring device can display measurements made by it, depending upon the state of the mode selector. In measuring device 10, these different units of measure are English and metric units, i.e., inches and millimeters. When the mode selector actuator is operated to its millimeter position, as shown in FIG. 2, the scale on dial 29 represents millimeters and tens of millimeters of travel of the metering wheel along measurement surface 24, and scale 28 represents tenths and hundredths of millimeters of such travel. When the actuator is in its inch position, the scale on dial 29 indicates inches and tenths of inches of travel, and the scale on dial 28 represents hundredths and thousandths of inches of travel of the metering wheel along the measurement surface. Thus, indicator 27 is dimensionless in nature and has significance in terms of the units of measure selected by the state of actuator 36.

Figure 5:
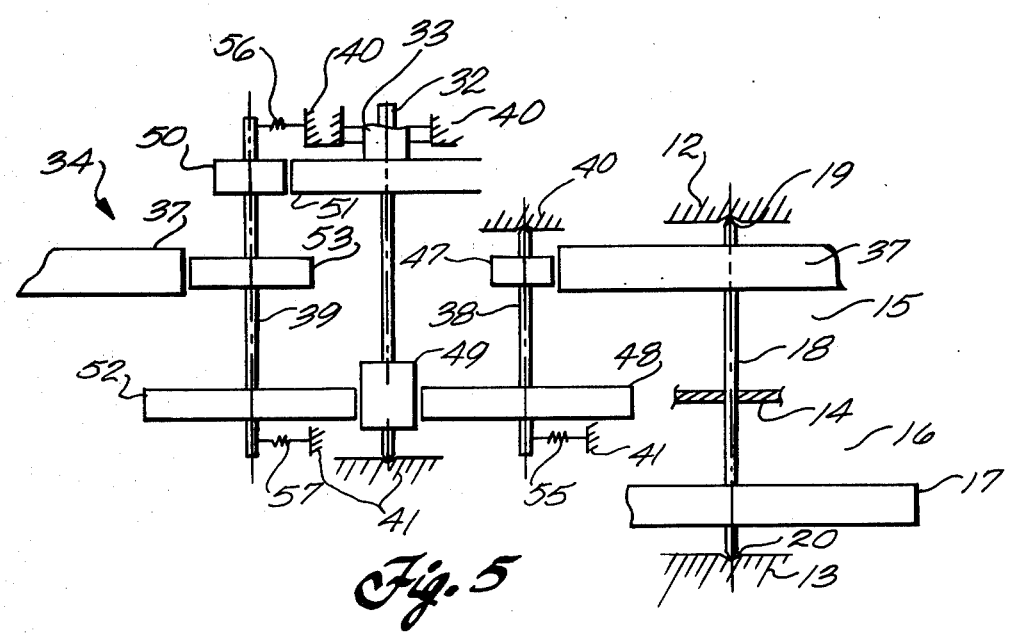
FIG. 5 is an elevation view illustrating the operative relationships between the components of the gearing for the indicator shown in FIG. 3.
Figure 9:
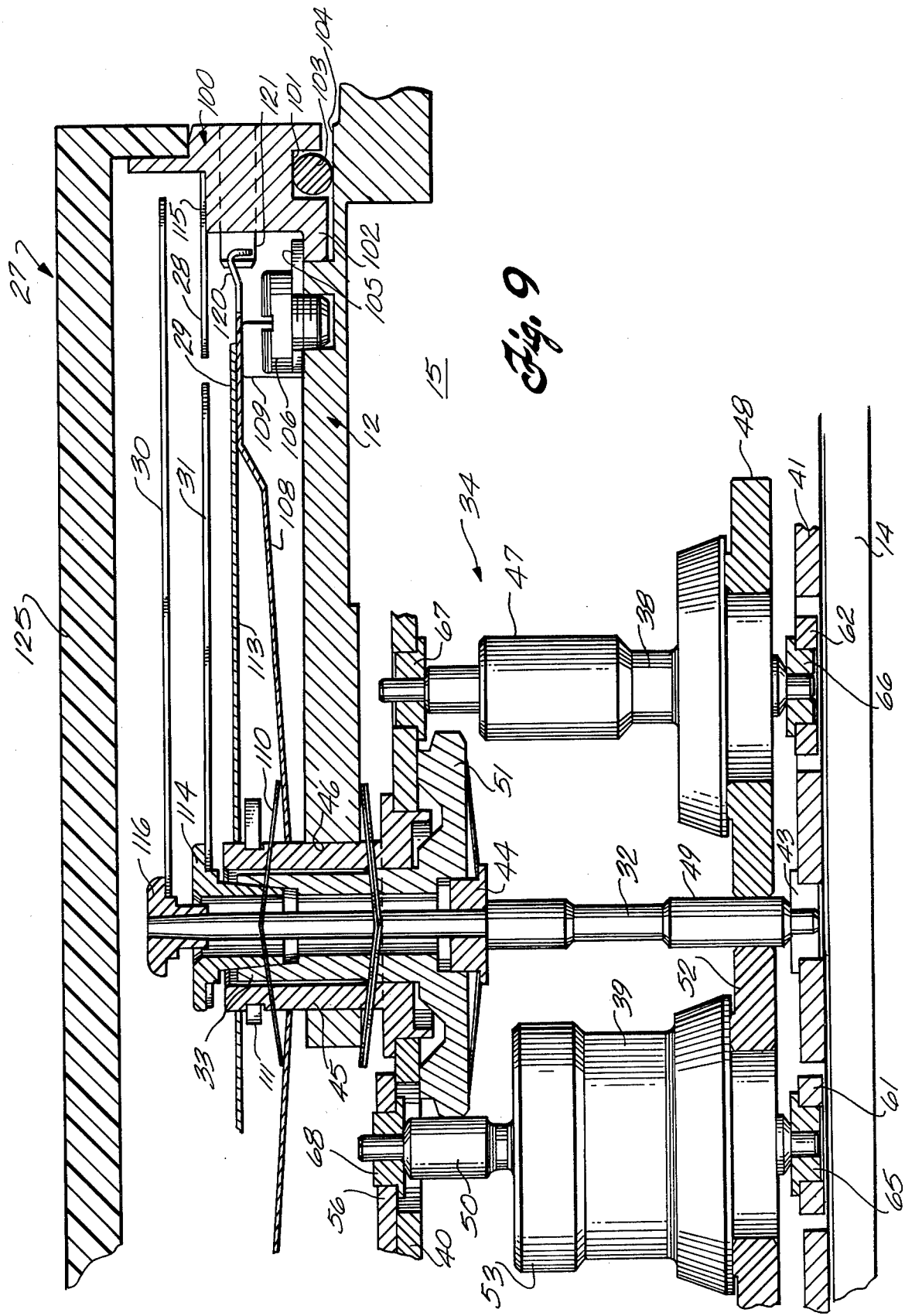
FIG. 9 is an enlarged fragmentary cross-sectional elevation view taken generally along line 9—9 in FIG. 8.

The gearing 34 within measuring device housing 11 is illustrated in FIGS. 4, 5 and 9. Metering wheel shaft 18 passes through housing intermediate plate 14. In lower chamber 16, shaft 18 has metering wheel 17 secured to it. All of the individual gears composing gearing 34 are disposed in housing upper chamber 15. Housing intermediate plate 14 functions as a chip exclusion plate to prevent metal chips, which may enter housing lower chamber 16 through the opening through which the rim of metering wheel 17 projects, from passing into the housing upper chamber and contaminating the precision motion amplifying gearing 34. In the housing upper chamber, metering wheel shaft 18 carries a main drive gear 37. The main drive gear rotates directly with the metering wheel.

Figure 6:
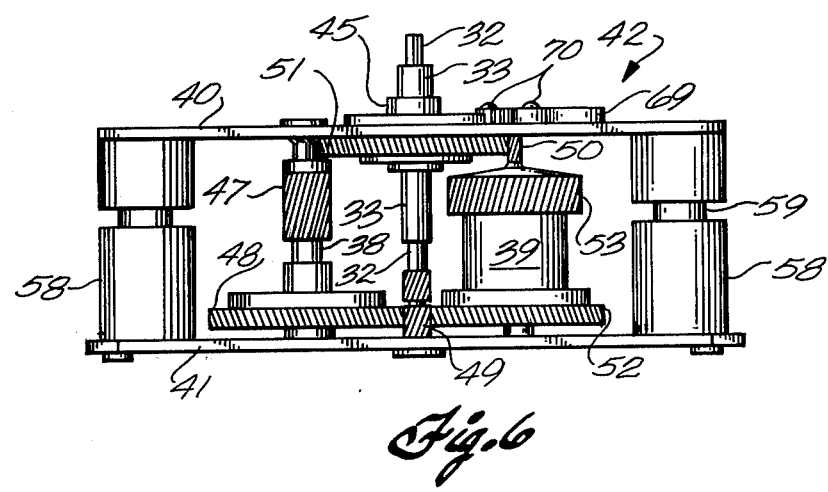
FIG. 6 is an elevation view of the shiftable gear cluster, in the gearing depicted in FIG. 5.
Figure 7:
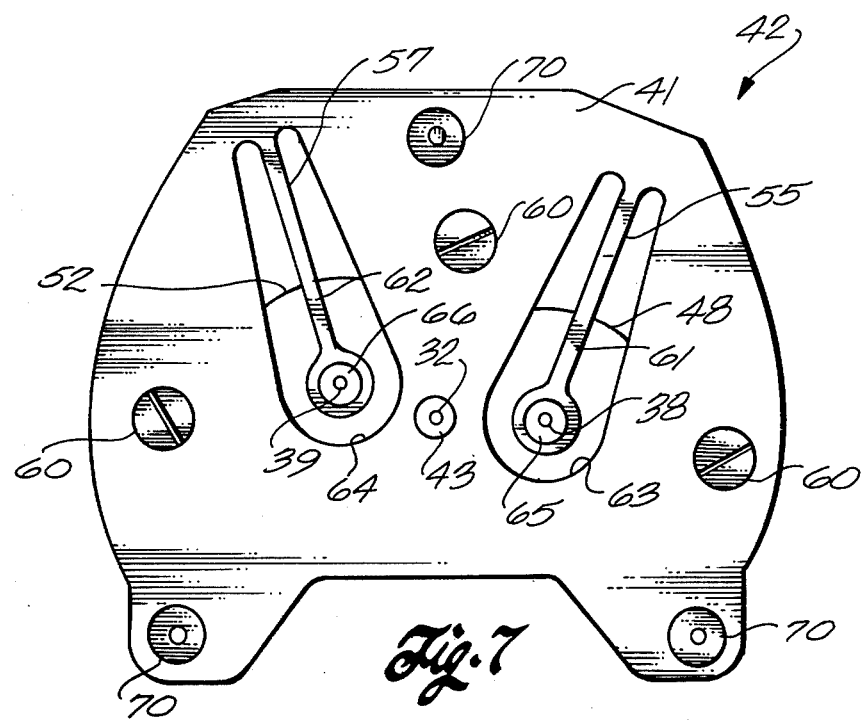
FIG. 7 is a bottom plan view of the gear cluster shown in FIG. 6.
Figure 8:
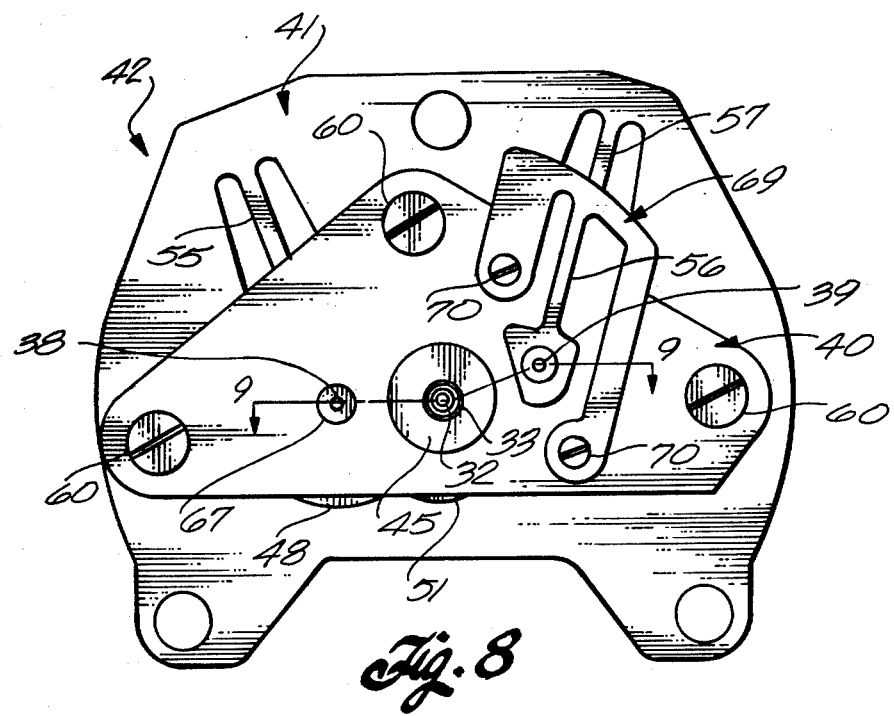
FIG. 8 is a top plan view of the gear cluster shown in FIG. 6.

Gearing 34 includes four shafts 32, 33, 38, and 39, all of which are disposed entirely in the housing upper chamber. These shafts are rotatably supported in top and bottom plates 40 and 41, respectively, of a gear cage 42 which is shown in FIGS. 6, 7, and 8. Shafts 32 and 33, as noted above, are coaxial shafts which constitute the input shafts to indicator 27. Shafts 38 and 39 are intermediate shafts in gearing 34. In view of the functions which they serve in the gearing, shafts 38 and 39 are also referred to, respectively, as the metric and English shafts of the gearing.

Inner indicator input shaft 32 rotates about an axis which is fixed relative to gear cage 42. It has its lower end engaged in a gearing 43 (FIG. 9) which is staked into the gear cage bottom plate. Adjacent its upper end, shaft 32 passes through a bearing 44 which is carried in a recess in an axial bore of outer indicator input shaft 33. Shaft 33 is in turn rotatably mounted in a sleeve 45 which is fixed to cage top plate 40 and which cooperates in an aperture 46, see FIGS. 11 and 12, formed in housing top part 12 essentially coaxially of indicator 27. The cooperation between sleeve 45 and aperture 46 defines the pivot point for angular motion of gear cage 42 relative to the housing top part. The motion occurs essentially about the common axes of indicator input shafts 32 and 33. The gear cage is angularly movable within housing top chamber 15 in response to operation of mode selector mechanism 35.

In a presently preferred embodiment of this invention, metering wheel 17 has a circumference of six inches. The gearing 34 which couples the metering wheel and the indicator input shafts is arranged so that one full traverse of the inner dial pointer 31 corresponds to either ten inches or ten centimeters of travel of the metering wheel along the measurement surface, depending upon the operative state of the mode selector mechanism 35. The gearing is arranged so that one full rotation of the longer dial pointer 30 about dial 28 corresponds to two-tenths of an inch or two millimeters of travel of the metering wheel. The overall gear ratio of gearing 34 for English measurements is therefore 1:30 or one full rotation of the inner indicator shaft 32 (which carries outer painter 30) for two-tenths of an inch of travel of the six inch circumference metering wheel. The overall gear ratio of gearing 34 when the mode selector is in its metric position is 1:76.2 or one full revolution of shaft 32 for two millimeters of travel of the six inch circumference metering wheel. The difference between these gear ratios is 2.54 which is the conversion factor between centimeters and inches.

As shown in FIGS. 5 and 9, metric shaft 38 carries a small diameter gear 47 adjacent its upper end and a larger diameter gear 48 adjacent its lower end. Gear 48 is always meshed with a pinion gear 49 carried by the lower end of indicator inner input shaft 32. English shaft 39 carries three gears, namely, (1) a small diameter output gear 50 which is always meshed with a larger diameter gear 51 carried (preferably integrally) on the lower end of outer indicator input shaft 33, (2) a large diameter gear 52 which is always meshed with gear 49, and (3) an intermediate diameter input gear 53 between gears 50 and 52. Gears 47 and 53 are alternate input pinion gears in that portion of gearing 34 which is carried by gear cage 42. Gear 47 is sometimes referred to herein as a metric input gear, whereas gear 53 is sometimes referred to as an English input gear. Gears 47 and 53 cooperate alternately with main drive gear 37, depending upon the operative state of mode selector 35. That is, depending upon the operative state of the mode selector, one or the other of gears 47 and 53 is disposed in a more directly driven relation with gear 37 and with metering wheel 17 than is the other.

In the presently preferred embodiment of this invention reflected in the accompanying drawings, main drive gear 37 has 180 teeth, gear 47 has 20 teeth, gear 48 has 127 teeth, gear 49 has 15 teeth, gear 52 has 120 teeth, gear 53 has 48 teeth, gear 50 has 16 teeth, and gear 51 has 100 teeth. Therefore, when English input gear 53 is engaged with main drive gear 37, as shown in solid lines in FIG. 4, the effective gear ratio between the main drive gear and the inner indicator input shaft 32 is 48:180×15:120=1:30. On the other hand, when metric input gear 47 is engaged with main drive gear 37, as shown in the broken line representation in FIG. 4, the effective gear ratio between the metering wheel and the inner indicator input shaft is 20:180×15:127=1:76.2. Indicator shaft 32 always rotates 50 times for each rotation of shaft 33 because gears 49 and 51 are interconnected by gears 52 and 50 on the English shaft 39. It is therefore apparent that, regardless of the operative state of the mode selector mechanism, English shaft 39 and the gearing carried thereby are operatively connected between the main drive gear and the indicator input shafts. The necessary conversion factor between English and metric units is defined by the difference (ratio) between the effective gear ratios between the main drive gear and the inner indicator input shaft via gears 47 and 48, on the one hand, and via gears 53 and 52 on the other hand.

In the representation of FIG. 5, main drive gear 37 is represented twice, once in association with gear 47 and again in association with gear 53, for the sake of clarity of illustration. It will be understood that only a single gear 37 is actually provided in measuring device 10.

In view of the preceding description, it will be appreciated that the common axis of shafts 32 and 33 is essentially fixed relative to the structure of the measuring device. The axes of shafts 38 and 39 are essentially fixed relative to the common axis of shafts 32 and 33. The gear cage 42 in which shafts 38 and 39 are mounted is angularly movable in the measuring device about the common axis of shafts 32 and 33 to enable gears 47 and 53 to be moved alternately into meshing relation with main drive gear 37. This alternate meshing of gears 47 and 53 with main drive gear 37 is represented in FIG. 4 by alternate positions of main gear 37, rather than (as is actually the case) by alternate positions of the axes of shafts 38 and 39.

As represented in FIG. 5, and as shown in FIGS. 7 and 8, the axis of metric shaft 38 at the upper end of the metric shaft is fixed to gear cage top plate 40, whereas its lower end is resiliently mounted to the gear cage bottom plate 41. Such resilient mounting of the lower end of the metric shaft is represented in FIG. 5 by spring 55. Also, the upper and lower ends of English shaft 39 are resiliently mounted to the gear cage top and bottom plates as represented by springs 56 and 57, respectively. Springs 55, 56, and 57 are components of means for anti-backlashing gearing 34 so that rotation of indicator input shafts 32 and 33 faithfully follows rotation of main gear 37 and metering wheel 17. Anti-backlashing springs 55, 56 and 57 are provided in the gear cage 42 itself, and the gear cage is further backlashed relative to housing 11 as described below. Thus, when either of gears 47 and 53 is meshed with main drive gear 37, such mesh is intimate and gears 47 and 53 follow reversals of motion of main gear 37 without backlash or lost motion in this phase of the gearing.

Gear cage 42 is composed principally of top and bottom plates 40 and 41 and by three equal length spacer posts 58. Each of the spacer posts has a circumferential recess 59 formed in it intermediate its length; one of these recesses is used to provide a coupling between the gear cage and mode selector mechanism 35. The spacer posts are secured between the cage top and bottom plates by screws 60 whose heads are countersunk into the upper and lower surfaces of the respective plates.

The anti-backlashing springs 55 and 57 for the lower ends of the metric and English shafts, respectively, are defined integrally with the cage bottom plate, as shown in FIG. 7. Accordingly, it is preferred that the cage bottom plate be fabricated of a material which has inherent high resilience, such as phosphor bronze or beryllium copper. Springs 55 and 56 are defined as fingers 61,62 of the basic bottom plate material which extend into cutouts 63 and 64 formed in the bottom plate as shown in FIG. 7. Fingers 61 and 62 are cantilevered from the major portions of the bottom plate and have enlarged pads at their free ends into which bearings 65 and 66 are staked for receipt of the lower ends of shafts 38 and 39, respectively. Since the upper end of metric shaft 38 carries no gear meshed with a gear carried by either of the indicator input shafts, the upper end of this shaft is mounted in a bearing 67 staked into an aperture formed in the cage top plate; see FIGS. 8 and 9. On the other hand, because English shaft 39 carries gear 50 which is meshed with indicator drive gear 51, it is necessary that this gear interface be anti-backlashed. Accordingly, the upper end of shaft 51 is engaged in a bearing 68 which is staked into the enlarged end of cantilever spring finger 56. Spring finger 56 is defined in a bearing plate 69 which is secured to the cage top plate by screws 70. The geometry of anti-backlash springs 55, 56 and 57, relative to the positions of the shafts associated with them, is such that the ends of these cantilevered springs must be deflected laterally to enable gears 48 and 52 to be meshed with gear 49 on shaft 32, and to enable gear 50 to be engaged with gear 51 on shaft 33. Accordingly, at all times following assembly of the gear cage, these springs are biased from their relaxed positions to cause the adjacent gears to be intimately meshed with the gears on the indicator input shafts.

The elongate extents of spring fingers 61, 62, and 56 are so geometrically oriented in the gear cage that they are aligned essentially radially of main drive gear 37 when the corresponding input gears 47 and 53 are meshed with the main drive gear. This geometric relation is established so that these springs are end-loaded when the corresponding input gears are meshed with the main drive gear, thus enabling these springs to withstand the higher forces associated with mesh of the respective input gears 47, 53 with the main drive gear. Forceful meshing of gears 47 or 53 with the main drive gear does not adversely affect the ability of springs 55, 56 and 57 to effectively antibacklash the gearing within the gear cage.

Gear cage 42 is supported upon the upper surface of housing intermediate plate 14. This support is a three point support via three dimples 70 which are raised from the lower surface of the cage bottom plate. The upper surface of the housing intermediate plate is greased in the vicinity of the gear cage to enable the dimples to slide on the intermediate plate as the gear cage is indexed angularly back and forth about the common axis of shafts 32 and 33 in response to operation of the mode selector mechanism. As noted above, the axis about which such motion of the cage occurs is defined by the cooperation of sleeve 45 in aperture 46 of the housing top part.

FIGS. 10, 11 and 12 show mode selector mechanism 35 and its relation to gear cage 42; FIGS. 11 and 12 show this relation in two different operating modes of the measuring device. As shown in FIG. 10, actuator 36 preferably is provided in the form of a circular plug rotatably received in an aperture 72 formed in housing top part 12, rearwardly of the location of the indicator on the top of the measuring device; see also FIG. 2. A pin 73 extends downwardly from the lower surface of the actuator at a location near the perimeter of the actuator, i.e., pin 73 is located eccentrically of the axis about which the actuator is rotatable in housing aperture 72. Pin 73 extends through a slightly oversized opening formed in a generally horizontal switch link 74. The switch link has a vertical leg 75 at its rear end. Leg 75 extends downwardly to and slides upon the upper surface of housing intermediate plate 14. Leg 75 is dimensioned to assure that the horizontal body of the switch link is always sufficiently close to the lower face of actuator 36 that pin 73 always passes through the switch link.

The switch link extends toward the forward portion of the housing in the housing upper chamber where it cooperates with a cage link 76 and a coil spring 77. The forward end of switch link 74 defines a narrow finger 78 (see FIG. 10) which has a length greater than the length of spring 77 and a width less than the inner diameter of the spring. At the rear end of finger 78, the switch link is configured to define a pair of spring bearing shoulders 89 on either side of the finger; see FIG. 11. Finger 78 is disposed in overlying intimate relation with a similarly configured finger 79 (see FIG. 10) defined by a rear portion of cage link 76. Finger 79 extends from between a pair of rearwardly facing spring bearing shoulders 90 (see FIG. 12) defined by the cage link. A pin 80 is carried by the rear end of cage link finger 79 and extends through a slot aperture 81 formed through the switch link adjacent the rear end of the finger 78 thereof. The elongate extent of aperture 81 is aligned with the length of finger 78. Similarly, a pin 82 is carried by the forward end of switch link finger 78 and extends through a slot aperture 83 formed in the cage link 76 adjacent the front end of the finger 79 thereof. Spring 77 is disposed about fingers 78 and 79 between pins 80 and 82 and between shoulders 89 and 90.

The forward portion of cage link 76 defines a yoke 84 (FIG. 12) which is engaged in the recess 59 of the one of the gear cage spacer posts 58 which lies forwardly of the position of actuator 36 in the housing 11. The cage link fork 84 opens away from the adjacent sidewall of the housing top part. At a location between the spacer post and the adjacent housing side wall, the cage link defines a knuckle 85 which cooperates, depending upon the state of the mode selector mechanism, with projection 86 defined by the housing side wall; see FIG. 12. Projection 86 serves, with knuckle 85, to limit the extent to which link 76 can move away from spacer 58, thus preventing yoke 84 from disengaging from the spacer after the mechanism is assembled.

In view of the preceding description of switch link 74, cage link 76, and spring 77, it is apparent that the switch and cage links cooperate to define a reciprocal lost-motion connection between eccentric pin 73 of actuator 36 and gear cage 42. When the measuring device is operated in its metric mode, the distance between pin 73 and spacer 58 is greater than the distance between these elements when the measuring device is operated in its English mode; compare FIGS. 11 and 12. Accordingly, when the measuring device is operated in its English mode (FIG. 11), the selector mechanism is shortened and spring 77 is compressed between shoulders 89 and 90; in this situation, pins 80 and 82 move apart from each other as finger 78 slides forwardly along finger 79. The reaction force applied by the spring to the links tends to cause the mechanism to tend to extend. However, such extension of the mechanism linkage is prevented by engagement of gear 53 with drive gear 37 and by interference of a corner 91 of switch link 74 with an inner wall of the housing; such interference provides a limiting stop for the mechanism in its English mode. In this position of the selector mechanism, actuator finger 73 is disposed between the line of action of spring 77 and the surface of the housing top part with which switch link corner 91 is engaged. Accordingly, the spring has a component of force upon finger 73 which causes the finger to tend to be driven toward the adjacent housing wall, but such motion is prevented by interference of the switch link corner with the housing wall; this is an over-center toggle effect. Therefore, the mode selector mechanism is held in this stable operating state by operation of spring 77 in this condition (English mode of operation) until the actuator is rotated in the direction of the arrow shown in FIG. 11, to cause the selector mechanism to toggle over-center against the bias of spring 77.

Conversely, as shown in FIG. 12, when the measuring device is in its metric mode, the actuator 36 is rotated to dispose pin 73 toward the rear of the housing in a position in which switch link corner 91 again engages the adjacent inner wall of the housing and in which pin 73 is disposed between the line of action of spring 77 and corner 91. The contact of corner 91 with the housing wall defines a second metric mode limiting stop for the mechanism. In this case, however, it is gear 47 which engages drive gear 37 to limit motion of cage 42. Thus, the linkage of the selector mechanism must extend between pin 73 and cage post 58. In this situation, the distance between pins 80 and 82 is reduced as the switch link finger 78 slides rearwardly along cage link finger 79. Spring 77 is now compressed between the pins. Thus, while the spring is this time compressed, again the reaction of the spring is such that it causes the selector linkage to tend to shorten, thereby more intimately urging gears 47 and 37 together and switch plate corner 91 into engagement with the housing wall. The mode selector maintains its stable metric mode state until actuator 36 is operated against the bias of spring 77 into its English mode state.

In view of the foregoing description, it is seen that mode selector mechanism 35 is an over-center mechanism which has two spaced toggle action positions; between these positions, the mechanism has a third stable idling state in which both of gears 47 and 53 are disengaged from drive gear 37. The resilient component of the mechanism, in combination with geometry of its linkage, causes the mechanism to be maintained in whichever one of its operative states is selected by a user of the device. That is, once the selector mechanism is operated into its metric state (see FIG. 2 where this condition is indicated by alignment of a screwdriver slot 94 in actuator 36 with a millimeter reference mark 95 on the top of the housing), the selector mechanism is maintained in that state until the user of the device operates the actuator into its English position. The English position of the actuator is indicated by alignment of slot 94 with an inch reference mark 96 on the housing (see FIG. 2). The geometry of the selector mechanism is arranged so that actuator 36 must be rotated through an angle of more than 180° to cause it to shift between its English and metric positions. If desired, a bistable toggle action selector and actuator mechanism can be used.

The directions along which the force of spring 77 is effective upon the gear cage are indicated by arrows in FIGS. 11 and 12. It will be recalled that the location about which the gear cage pivots relative to housing 11 is defined by aperture 46 which is shown in FIGS. 11 and 12. Thus, when the measuring device is disposed in its English mode, the reaction force of spring 77 on the gear cage urges the cage to rotate counterclockwise about aperture 46 in which cage sleeve 45 is journaled. The English input gear 53, however, is disposed in the gear cage between aperture 46 and the spacer post with which the selector mechanism is engaged. Thus, the point of engagement of gear 53 with main drive gear 37 forms a fulcrum about which the cage tends to rotate in response to the force applied to the cage by spring 77, thereby causing sleeve 45 to tend to move in the direction of actuator 36. On the other hand, with reference to FIG. 12, when the measuring device is disposed in its metric condition, the force applied to gear cage 42 by spring 77 is reversed, but now it is metric input gear 47 on the opposite side of sleeve 45 which is engaged with main drive gear 37. The point at which gears 47 and 37 mesh forms a fulcrum about which the cage tends to rotate in response to the force applied to the cage by spring 77. Again, the line of reaction between the gear cage and housing top part 12 is along substantially the same line, i.e., toward actuator 36. Thus, regardless of the operating condition in which the measuring device is disposed by the mode selector, the loading of the gear cage against the housing is substantially the same. Accordingly, a semi-circular lobe 98 of diameter less than that of aperture 46 is formed in the periphery of aperture 46 and is centered along a line between the center of aperture 46 and the location of actuator 36. The two points of intersection of this lobe with the boundaries of aperture 46 define two points against which sleeve 45 is urged regardless of which operating condition prevails in the measuring device at the time.

Gear cage 42 must be rotatable within housing 12 in order to enable input gears 47 and 53 to be engaged alternately with main drive gear 37. Such rotation is afforded by a bearing, i.e., the cooperation of sleeve 45 in aperture 46. Bearings have tolerance inherently, and as bearings are operated the tolerance thereof tends to increase. If a purely circular bearing mechanism were used to mount the gear cage to the housing, these tolerances, initially or as increased in use, would result in hysteresis or backlash in the measuring device as the metering wheel is reversed in direction. The design of gear cage 42 and of mode selector mechanism 35, and particularly the careful consideration given to the lines along which forces act in this structure, is such to cause the reaction force between the cage and the housing to always act along essentially the same line. Thus, regardless of the condition of wear of the internal parts of the measuring device, the gear cage is always urged against the same two points of the housing under a force derived from selector mechanism spring 77. This arrangement prevents the gear cage from shifting left or right relative to the housing, i.e., around the main drive gear, in response to changes in rotational direction of metering wheel 17. This arrangement therefore eliminates any hysteresis or backlash from the mechanism due to the ability of the gear cage to rotate within the housing of the measuring device. Moreover, the force developed by spring 77 also provides anti-backlashing between main drive gear 37 and whichever of input gears 47 and 53 is engaged with it. The gearing wholly within the gear cage is anti-backlashed as described above with reference to springs 55, 56, and 57. Thus, the entire mechanism within the measuring device is anti-backlashed so that indicator input shafts 32 and 33 always rotate faithfully in response to rotation of metering wheel 17, including through reversals of motion of the metering wheel.

Indicator 27 is a resettable indicator in that it can be zeroed or preset to any desired measurement at any time desired by a user. The indicator may be preset or zeroed without requiring disengagement of metering wheel 17 from measurement surface 24. To enable these operations to be accomplished, indicator scales 28 and 29 are frictionally clutched to housing 11.

As shown best in FIG. 9, indicator 27 includes an annular bezel 100 which has a downwardly opening recess 101 in its lower face and a radially inwardly extending flange 102 around its inner circumference. An O-ring 103 is disposed in bezel recess 101 to bear against a top surface 104 of housing top part 12. The bezel is resiliently biased downwardly toward surface 104 by a plurality of bezel retainer springs 105 which are secured by screws 106 to the housing inside the annulus of the bezel. The exterior of the bezel is manually engageable so that it can be rotated against the friction provided by the compression of the O-ring between the bezel and housing surface 104 and between the upper surface of flange 102 and bezel retainer springs 105.

A centrally dished, inner dial carrier 108 is disposed concentrically of sleeve 45 between the sleeve and the bezel. Adjacent its perimeter, the lower surface of carrier 108 engages a plurality of support posts 109 which extend upwardly from the housing top part inwardly of the bezel at suitably spaced locations about the circumference of sleeve 45. Inner dial carrier 108 is urged downwardly against spacer posts 109 by a resilient wave washer 110. The wave washer is engaged circumferentially of sleeve 45 between the upper surface of the carrier and a retainer ring 111 engaged with the exterior of the sleeve above the washer. The wave washer reacts between the retainer ring and the inner dial carrier to apply a downward force to the carrier. Inner scale 29 is defined along the outer margins of a circular inner scale plate 113 which is connected, as by gluing, to the outer portions of carrier 108. Pointer 31 is connected to outer indicator input shaft 33 by an axially bored coupling hub 114 through which inner indicator input shaft 32 extends as shown in FIG. 9. The outer indicator scale is defined on an annular scale plate 115 which is secured, as by gluing, to bezel 100. Pointer 30 is connected to the upper end of inner indicator input shaft 32 by a suitable coupling hub 116 and cooperates with dial 28 as shown in FIG. 9.

At a selected location along its periphery, preferably adjacent to the location on dial 29 where the zeros for the two indicia sequences thereof are aligned (see FIG. 3), the inner scale carrier 108 defines a finger 120 which extends radially outwardly from the periphery of the carrier toward but not to the inner surface of bezel 100. A projection 121 extends inwardly from the inner surface of bezel 100 below outer scale plate 115; preferably the projection is positioned below the point on the scale of dial 28 where one or the other of the two sets of aligned zeros for the two sequences of scale indicia for dial 28 occur, and one of the zeros on the dial scale at such location is filled in to appear as a dot (see FIG. 3). The inner end of projection 121 is disposed closer to the common axis of indicator shafts 32 and 33 than is the outer end of finger 120. Finger 120 and projection 121 have the same elevation above housing top surface 104. Accordingly, at some point in the rotation of bezel 100 about the indicator axis against the frictional coupling of the bezel to the housing, projection 121 will contact finger 120 of the inner scale carrier. Continued rotation of the bezel about the indicator axis will then cause the inner scale carrier to be rotated about the indicator axis against the frictional coupling of the inner scale carrier to the housing. Thus, by appropriate rotation of bezel 100, first inner dial 29 can be rotated in either direction desired about the indicator axis to cause its scale to be zeroed or preset relative to the stationary position of indicator pointer 31. Then, by rotation of the bezel in the opposite direction, outer dial 28 can be zeroed or preset relative to the stationary indicator pointer 30. Dot 122 on dial 28 enables the user of the measuring device to know where projection 121 is located on the circumference on the bezel, thereby to facilitate rapid zeroing or presetting of the indicator. The user will readily appreciate that finger 120 is located adjacent to the zero location on the dial 29.

The stiffness of the frictional couplings of inner scale carrier 108 and of bezel 100 to housing 11 is sufficiently great to prevent either of dials 28 or 29 from rotating about the indicator axis during normal use of the measuring device. These frictional clutch arrangements, however, are not sufficiently stiff that the indicator cannot readily be operated in the manner described above by the user.

A transparent crystal 125 is secured to bezel 100 to protectively enclose dials 28 and 29 and pointers 30 and 31, and yet still provide visual resort to indicator 27.

Finger 120 and projection 121 of the resettable indicator mechanism described above function to enable the inner and outer dials to be angularly driven about the indicator axis in a manner analogous to the way in which tumbler plates in a combination lock are driven in response to rotation of the lock dial in opposite directions.

The resettable dual concentric dial indicator mechanism described above and shown in FIG. 9, for example, is not a part of the present invention. It is described and claimed in copending application Ser. No. 870,269 filed Jan. 18, 1978 and owned by the assignee of this invention.

In view of the foregoing description, it is apparent that this invention provides a reliable and efficient solution to the need identified above. This invention enables the provision of a friction wheel metering device which can be used as an add-on accessory to a machine tool or the like to obtain accurate and precise measurements of distance in either one of two units of measure of interest, such as inches and millimeters. The mechanism of this invention avoids backlash in the gearing thereof so that the output of the mechanism always accurately reflects the input to the mechanism. The mechanism is compact, thus making it possible to use this invention in applications not possible with the mechanisms relied upon in previously known conversion dial assemblies for machine tools.

Workers skilled in the art to which this invention pertains will readily appreciate that modifications or alterations in the structure described above may be made without departing from the scope of this invention. The foregoing description is of a presently preferred embodiment of this invention, which embodiment is merely one form in which the principles and teachings of this invention may be applied. Accordingly, the preceding description should not be considered as limiting or restricting the scope of this invention.

What is claimed is:

1. Mechanical apparatus for alternately displaying measurements, in either one of two different units of measure, the apparatus having an input shaft rotatable about an axis fixed in a frame and comprising dimensionless rotary indicator means carried by the frame at a fixed location thereon to be visually observable by a user, the indicator means having rotatable input means and including scale means calibrated in units and selected fractions thereof, motion amplifying gear means carried by the frame and continuously coupled to the indicator means for operating the indicator input means faithfully in response to rotation of the apparatus input shaft, the gear means including alternate input gears rotatable about separate axes alternately engageable in a more directly driven relation than the other with a single common drive gear driven in response to rotation of the apparatus input shaft, and selectively operable mode selector means operable for engaging one or the other of the alternate input gears in said more directly driven relation, the gear ratios between the input gears and the indicator input means being different by an amount corresponding to the conversion factor between the two different units of measure, the scale means itself being dimensionless with the same aspects thereof operable to display a measurement when one of the alternate input gears is more directly engaged with the apparatus input shaft as when the other alternate input gear is more directly engaged with the apparatus input shaft.

2. Apparatus according to claim 1 wherein the indicator means comprises a pair of concentric circular scales and a rotary pointer cooperating with each of the scales.

3. Apparatus according to claim 1 wherein the input shaft carries a wheel of predetermined circumferential extent which is engageable with a surface along which measurements are to be made.

4. A friction wheel distance measuring device for alternately visually displaying measurements made thereby in either one of two different units of measure, the device comprising a frame, a metal rimmed metering wheel of predetermined circumference mounted to the frame for rotation about an axis fixed relative to the frame so that a portion of the wheel circumference is engageable with a surface along which measurements are to be made, dimensionless rotary indicator means carried by the frame at a fixed location thereon to be visually observable by a user of the device, the indicator means having rotatable input means and including scale means calibrated in units and selected fractions thereof, motion amplifying indicator drive gear means carried by the frame driven by the metering wheel and continuously coupled to the indicator input means for operating the indicator input means in a predetermined manner faithfully in response to rotation of the metering wheel, the indicator drive gear means including alternate input gears rotatable about separate axes alternately engageable in a more directly driven relation than the other with a single common drive gear driven in response to rotation of the metering wheel, and selectively operable selector means operable for engaging one or the other of the alternate input gears in said more directly driven relation with the metering wheel, the gear ratios between the input gears and the indicator input means being different by an amount corresponding to the conversion factor between the two different units of measure, the scale means itself being dimensionless with the same aspects thereof operable to display a measurement when one of the alternate input gears is more directly engaged with the apparatus input shaft as when the other alternate input gear is more directly engaged with the apparatus input shaft.

5. Apparatus according to claim 4 wherein the indicator means comprises a pair of concentric circular scales and a rotary pointer cooperating with each of the scales.

6. A friction wheel distance measuring device for alternately visually displaying measurements made thereby in either one of two different units of measure, the device comprising a frame, a metal rimmed metering wheel of predetermined circumference rotatably mounted to the frame so that a portion of the wheel circumference is engageable with a surface along which measurements are to be made, dimensionless rotary indicator means carried by the frame to be visually observable by a user of the device, the indicator means having rotatable input means and including scale means calibrated in units and selected fractions thereof, motion amplifying indicator drive gear means carried by the frame driven by the metering wheel and continuously coupled to the indicator input means for operating the indicator input means in a predetermined manner faithfully in response to rotation of the metering wheel, the indicator drive gear means including alternate input gears rotatable about separate axes alternately engageable in a more directly driven relation than the other with a single common drive gear driven in response to rotation of the metering wheel, the gear ratios between the input gears and the indicator input means being different by an amount corresponding to the conversion factor between the two different units of measure, selectively operable selector means operable for engaging one or the other of the alternate input gears in said more directly driven relation with the metering wheel, the scale means itself being dimensionless with the same aspects thereof operable to display a measurement when one of the alternate input gears is more directly engaged with the apparatus input shaft as when the other alternate input gear is more directly engaged with the apparatus input shaft, the selector means having two stable operative states thereof corresponding to said more directly driven relation of each of the input gears, respectively, the selector means having associated with it two limits of operation thereof, each limit corresponding to a respective one of the operative states of the selector means, and including means effective in either operative state of the selector means biasing said means to the corresponding limit.

7. A friction wheel distance measuring device for alternately visually displaying measurements made thereby in either one of two different units of measure, the device comprising a frame, a metal rimmed metering wheel of predetermined circumference rotatably mounted to the frame so that a portion of the wheel circumference is engageable with a surface along which measurements are to be made, dimensionless rotary indicator means carried by the frame to be visually observable by a user of the device, the indicator means having rotatable input means and including scale means calibrated in units and selected fractions thereof, motion amplifying indicator drive gear means carried by the frame driven by the metering wheel and continuously coupled to the indicator input means for operating the indicator input means in a predetermined manner faithfully in response to rotation of the metering wheel, the indicator drive gear means including alternate input gears rotatable about separate axes alternately engageable in a more directly driven relation than the other with a single common drive gear driven in response to rotation of the metering wheel, the gear ratios between the input gears and the indicator input means being different by an amount corresponding to the conversion factor between the two different units of measure, and selectively operable selector means operable for engaging one or the other of the alternate input gears in said more directly driven relation with the metering wheel, the scale means itself being dimensionless with the same aspects thereof operable to display a measurement when one of the alternate input gears is more directly engaged with the apparatus input shaft as when the other alternate input gear is more directly engaged with the apparatus input shaft, the selector means having two stable operative states thereof corresponding to said more directly driven relation of each of the input gears, respectively, the selector means and the drive gear means being cooperatively related to cause the drive gear means to have substantially the same direction of loading against the frame when one of said alternate input gears is engaged in said more directly driven relation as when the other of the alternate input gears is engaged in said relation.

8. A friction wheel distance measuring device for alternately visually displaying measurements made thereby in either one of two different units of measure, the device comprising a frame, a metal rimmed metering wheel of predetermined circumference rotatably mounted to the frame so that a portion of the wheel circumference is engageable with a surface along which measurements are to be made, dimensionless rotary indicator means carried by the frame to be visually observable by a user of the device, the indicator means having rotatable input means and being calibrated in units and selected fractions thereof, the indicator input means comprising first and second concentric rotary shafts, motion amplifying indicator drive gear means carried by the frame driven by the metering wheel and continuously coupled to the indicator input means for operating the indicator input means for operating the indicator input means in a predetermined manner faithfully in response to rotation of the metering wheel, the indicator drive gear means including alternate input gears alternately engageable in a more directly driven relation with the metering wheel than the other, the indicator drive gear means further comprising a gear carried by each of the shafts, a main drive gear disposed coaxially of the metering wheel and rotatable therewith, and a pair of intermediate gear shafts each carrying one of the alternate input gears and also carrying an output gear engaged with the first shaft gear, one of the intermediate shafts also carrying a second output gear engaged with the second shaft gear, selectively operable selector means operable for engaging one or the other of the alternate input gears in said more directly driven relation with the metering wheel, and carrier means rotatably mounting the first and second and both intermediate shafts with the axes thereof in fixed relation to each other, the carrier means being mounted for movements relative to the frame in response to operation of the selector means between a first operative position in which one of the alternate input gears is engaged with the main drive gear and a second operative position in which the other alternate input gear is engaged with the main gear, and the gear ratios between the input gears and the indicator input means being different by an amount corresponding to the conversion factor between the two different units of measure.

9. Apparatus according to claim 8 wherein the carrier means is angularly movable relative to the frame about a pivot axis.

10. Apparatus according to claim 9 wherein the carrier means pivot axis is essentially collinear with the common axis of the first and second shafts of the indicator means.

11. Apparatus according to claim 10 including antibacklashing means coupled to the gears carried by said shafts.

12. Apparatus according to claim 10 including resilient means operatively coupled to the carrier means in the operative positions thereof and effective between the main drive gear and the input gears and between the carrier means and the frame for eliminating lost motion between the metering wheel and the indicator means upon reversal of rotation of the metering wheel.

13. Apparatus according to claim 12 wherein said resilient means comprises a spring component of the selector means in combination with the geometry of the shafts and gears carried by the carrier means.

14. Apparatus according to claim 13 wherein said geometry and the selector means are cooperatively configured and arranged to cause the loading of the carrier means on the frame to act along substantially the same line when one of the alternate input gears is engaged with the main drive gear as when the other alternate input gear is so engaged.

15. Apparatus according to claim 14 wherein the selector means includes a reciprocal lost motion coupling connected between the carrier means and an actuator member of the selector means, said coupling having extended and shortened states thereof in the first and second operative positions of the carrier means respectively, and wherein the resilient means comprises a coil spring associated with the lost motion coupling in such manner as to be deflected in the same manner in the extended and shortened states of the coupling and to urge the coupling out of whichever one of said states in which it may be disposed in response to operation of the actuator member.

16. Apparatus according to claim 8 wherein the first and second and intermediate shafts are parallel to each other.

17. A friction wheel distance measuring device for alternately visually displaying measurements made thereby in either one of two different units of measure, the device comprising a frame, a metal rimmed metering wheel of predetermined circumference mounted to the frame for rotation about an axis so that a portion of the wheel circumference is engageable with a surface along which measurements are to be made, dimensionless rotary indicator means carried by the frame at a location fixed relative to the metering wheel axis to be visually observable by a user of the device, the indicator means having rotatable input means and being calibrated in units and selected fractions thereof, motion amplifying indicator drive gear means carried by the frame driven by the metering wheel and continuously coupled to the indicator input means for operating the indicator input means in a predetermined manner faithfully in response to rotation of the metering wheel, the indicator drive gear means including alternate input gears alternately engageable in a more directly driven relation with the metering wheel than the other, the input gears having separate axes of rotation fixed in relation to each other and movable relative to the indicator means location and to the metering wheel axis, and selectively operable selector means operable for engaging one or the other of the alternate input gears in said more directly driven relation with the metering wheel, the gear ratios between the input gears and the indicator input means being different by an amount corresponding to the conversion factor between the two different units of measure.

18. Mechanical apparatus for alternately displaying measurements, in either one of two different units of measure, the apparatus having an input shaft rotatable about an axis fixed in a frame and comprising dimensionless rotary indicator means carried by the frame at a fixed location thereon to be visually observable by a user, the indicator means having rotatable input means and including scale means calibrated in units and selected fractions thereof, motion amplifying gear means carried by the frame and continuously coupled to the indicator means for operating the indicator input means faithfully in response to rotation of the apparatus input shaft, the gear means including alternate input gears rotatable about separate axes means including alternate input gears alternately engageable in a more directly driven relation than the other with a single common drive gear driven in response to rotation of the apparatus input shaft, antibacklashing means for the gear means including means biasing the alternate input gears substantially radially toward the drive gear during mesh of each alternate input gear with the drive gear, and selectively operable mode selector means operable for engaging one or the other of the alternate input gears in said more directly driven relation, the gear ratios between the input gears and the indicator input means being different by an amount corresponding to the conversion factor between the two different units of measure, the scale means itself being dimensionless with the same aspects thereof operable to display a measurement when one of the alternate input gears is more directly engaged with the apparatus input shaft as when the other alternate input gear is more directly engaged with the apparatus input shaft.

19. Mechanical apparatus for alternately displaying measurements, in either one of two different units of measure, the apparatus having an input shaft rotatable about an axis fixed in a frame and comprising dimensionless rotary indicator means carried by the frame at a fixed location thereon to, be visually observable by a user, the indicator means having rotatable input means and including scale means calibrated in units and selected fractions thereof, motion amplifying gear means carried by the frame and continuously coupled to the indicator means for operating the indicator input means faithfully in response to rotation of the apparatus input shaft, the gear means including alternate input gears movable radially relative to a single common drive gear driven in response to rotation of the input shaft alternately into and out of more directly driven relation with the drive gear than the other, and selectively operable mode selector means operable for engaging one or the other of the alternate input gears in said more directly driven relation, the gear ratios between the input gears and the indicator input means being different by an amount corresponding to the conversion factor between the two different units of measure, the scale means itself being dimensionless with the same aspects thereof operable to display a measurement when one of the alternate input gears is more directly engaged with the apparatus input shaft as when the other alternate input gear is more directly engaged with the apparatus input shaft.

20. Apparatus according to claim 19 including antibacklashing means biasing each alternate input gear, when disposed in said more directly driven relation, substantially radially toward the drive gear directly into mesh therewith.

21. Mechanical apparatus for alternately displaying measurements in either one of two different units of measure, the apparatus having an input shaft rotatable about an axis fixed in a frame and comprising dimensionless rotary indicator means carried by the frame at a fixed location thereon to be visually observable by a user, the indicator means having rotatable input means and including scale means calibrated in dimensionless units and fractions thereof with the same aspects of the scale means being operable to display a measurement according to one of the units of measure as are operable to display a measurement according to the other unit of measure, motion amplifying gear means coupled between the apparatus input shaft and the input means of the indicator means for operating the indicator means faithfully in response to rotation of the apparatus input shaft, the gear means including a single drive gear carried by the apparatus input shaft for rotation therewith and alternate input gears rotatable about separate axes and alternately movable into and out of mesh with the drive gear, the gear ratios between the drive gear and the input means of the indicator means via the alternate input gears being different by an amount corresponding to the conversion factor between the two different units of measure, selectively operable mode selector means operable for moving the input gears alternately into and out of mesh with the drive gear, and antibacklash means resiliently biasing the components of the gear means into mesh with each other.

* * * * *

UNITED STATES PATENT AND TRADEMARK OFFICE
CERTIFICATE OF CORRECTION

PATENT NO. : 4,200,985

DATED : May 6, 1980

INVENTOR(S) : Irven H. Culver and Oleg Szymber

It is certified that error appears in the above—identified patent and that said Letters Patent is hereby corrected as shown below:

Col. 1, line 45, for "of" (second occurrence) read -- or --.
Col. 5, line 39, for "molten" read -- motion --;
       line 41, for "is and" read -- and is --.
Col. 6, line 46, for "gearing" read -- bearing --.
Col. 7, line 7, for "painter" read -- pointer --;
       line 11, before "shaft" read -- inner --;
       lines 12, 13, for "difference" read -- ratio --.
Col. 17, lines 21, 22, delete "for operating the indicator input means".
Col. 19, line 29, delete the comma after "to".

Signed and Sealed this

Eighteenth Day of November 1980

[SEAL]

Attest:

Attesting Officer

SIDNEY A. DIAMOND

Commissioner of Patents and Trademar